United States Patent [19]
Lorenzo

[11] Patent Number: 6,153,959
[45] Date of Patent: Nov. 28, 2000

[54] AXLE-LESS ELECTROMAGNETIC ROTATING ASSEMBLY

[76] Inventor: Raul A. Lorenzo, P.O. Box 16-1098, Miami, Fla. 33116-9998

[21] Appl. No.: 09/354,438

[22] Filed: Jul. 16, 1999

[51] Int. Cl.[7] .......................... H02K 19/14; H02K 7/02; H02K 17/02
[52] U.S. Cl. .......................... 310/162; 310/74; 310/112; 310/114
[58] Field of Search .................. 310/75 C, 75 D, 310/101, 102 R, 112, 113, 114, 162, 166, 168, 171, 174, 259, 258, 261, 265, 266, 268, 90.5; 29/596, 598, 597

[56] References Cited

U.S. PATENT DOCUMENTS

| | | | |
|---|---|---|---|
| 3,775,626 | 11/1973 | Burgbacher | 310/67 R |
| 3,814,960 | 6/1974 | Burgbacher | 310/60 R |
| 4,315,171 | 2/1982 | Schaeffer | 310/49 R |
| 5,056,213 | 10/1991 | Behnke et al. | 29/596 |
| 5,065,060 | 11/1991 | Takahashi et al. | 310/74 |
| 5,113,105 | 5/1992 | Ikegami et al. | 310/233 |
| 5,266,860 | 11/1993 | Chiba et al. | 310/233 |
| 5,370,509 | 12/1994 | Golding et al. | 417/423.1 |
| 5,485,047 | 1/1996 | Bahn | 310/166 |
| 5,508,574 | 4/1996 | Vlock | 310/113 |
| 5,547,350 | 8/1996 | Rawal et al. | 417/354 |
| 5,645,017 | 7/1997 | Melchior | 123/41.15 |
| 5,646,465 | 7/1997 | Paweletz | 310/90.5 |
| 5,675,203 | 10/1997 | Schulze et al. | 310/113 |
| 5,696,419 | 12/1997 | Rakestraw et al. | 310/268 |
| 5,793,140 | 8/1998 | Tuckey | 310/237 |
| 5,856,714 | 1/1999 | Sugiura | 310/49 R |
| 5,949,174 | 9/1999 | Moss et al. | 310/233 |

*Primary Examiner*—Nestor Ramirez
*Assistant Examiner*—Tran N Nguyen

[57] ABSTRACT

Electric rotating machines and/or assembly which, dependent upon the specific embodiments utilized may be in the form of a motor, generator or combination of both wherein a common stator assembly is disposed in an operative position relative to at least one but in some embodiments a plurality of rotor assemblies preferably having annular configuration and further being defined by a central opening in which the stator assembly is mounted. The supporting structure has the stator assembly fixedly attached thereto as well as the one or more rotor assemblies moveably mounted thereon in rotational travel relative to the stator assembly and, dependent upon the embodiments, relative to one another when a plurality of rotor assemblies are utilized. One feature of the overall structure is an increase in versatility and applicability for specific practical application by eliminating the use, need or requirement of a central support shaft commonly found in prior motors/generators. One or more power takeoff assemblies may be connected in driven relation to one or more rotor assemblies and may further be disposed exteriorly of both the one or more rotor assemblies and the stator assembly.

29 Claims, 14 Drawing Sheets

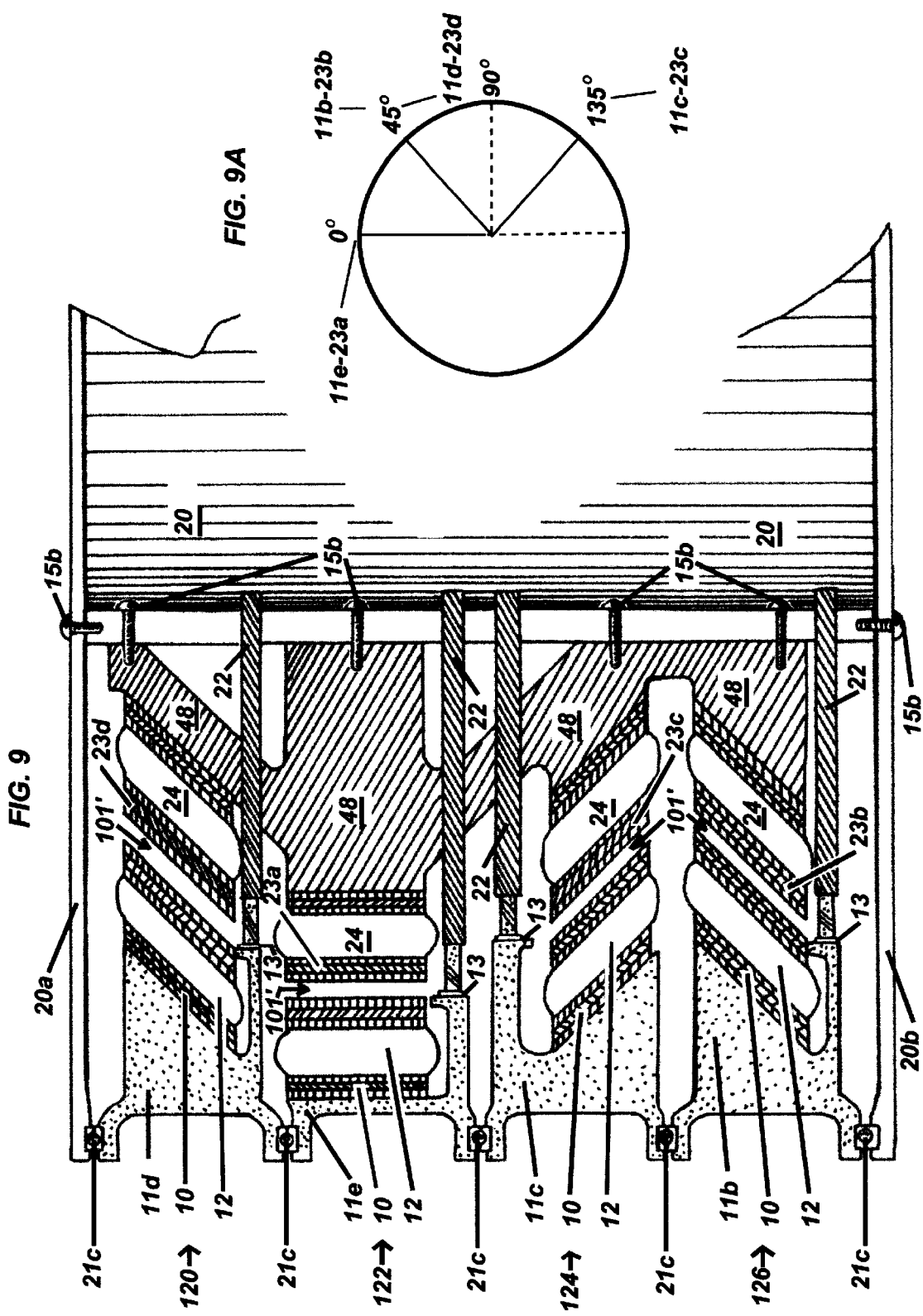

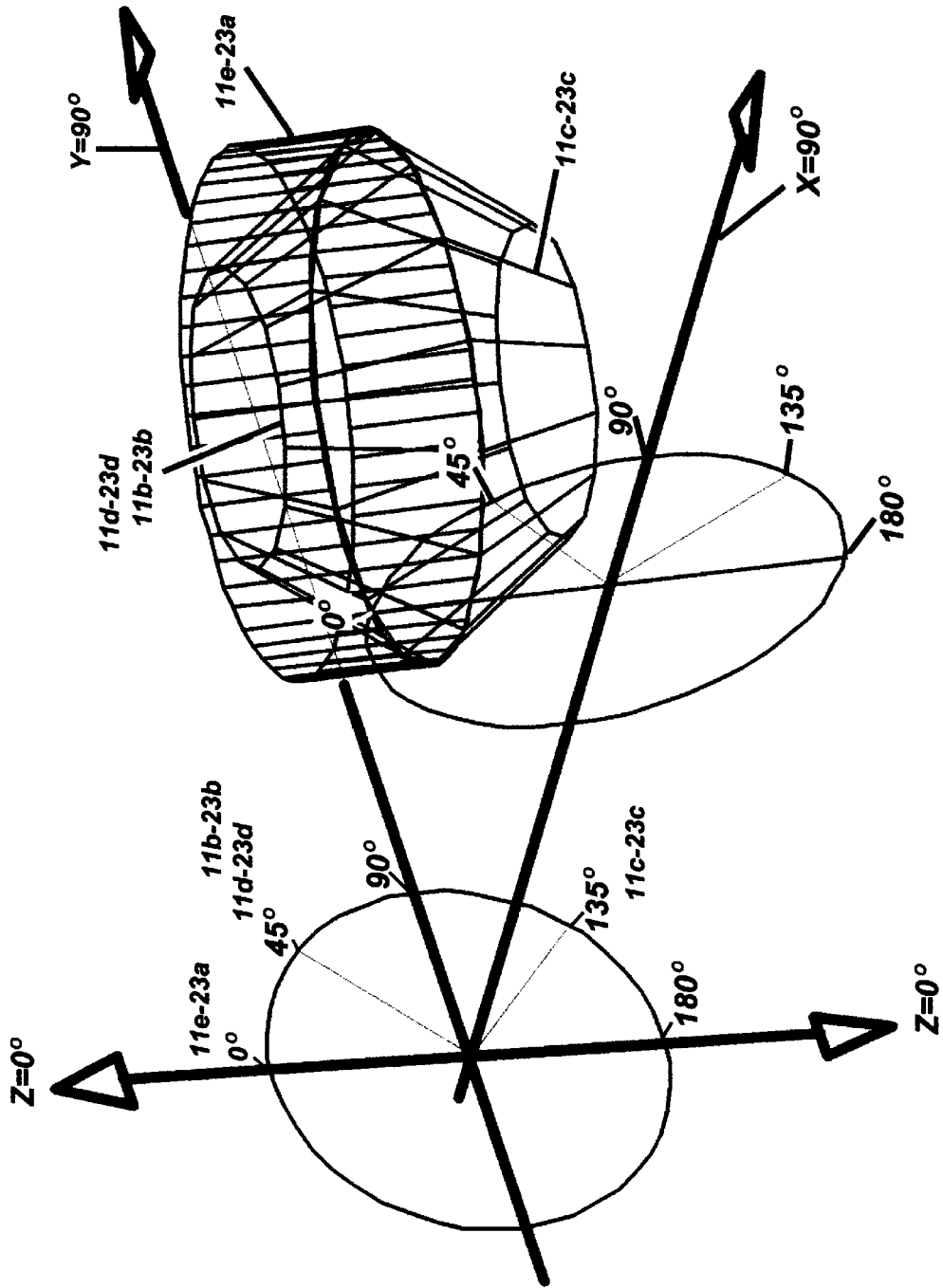

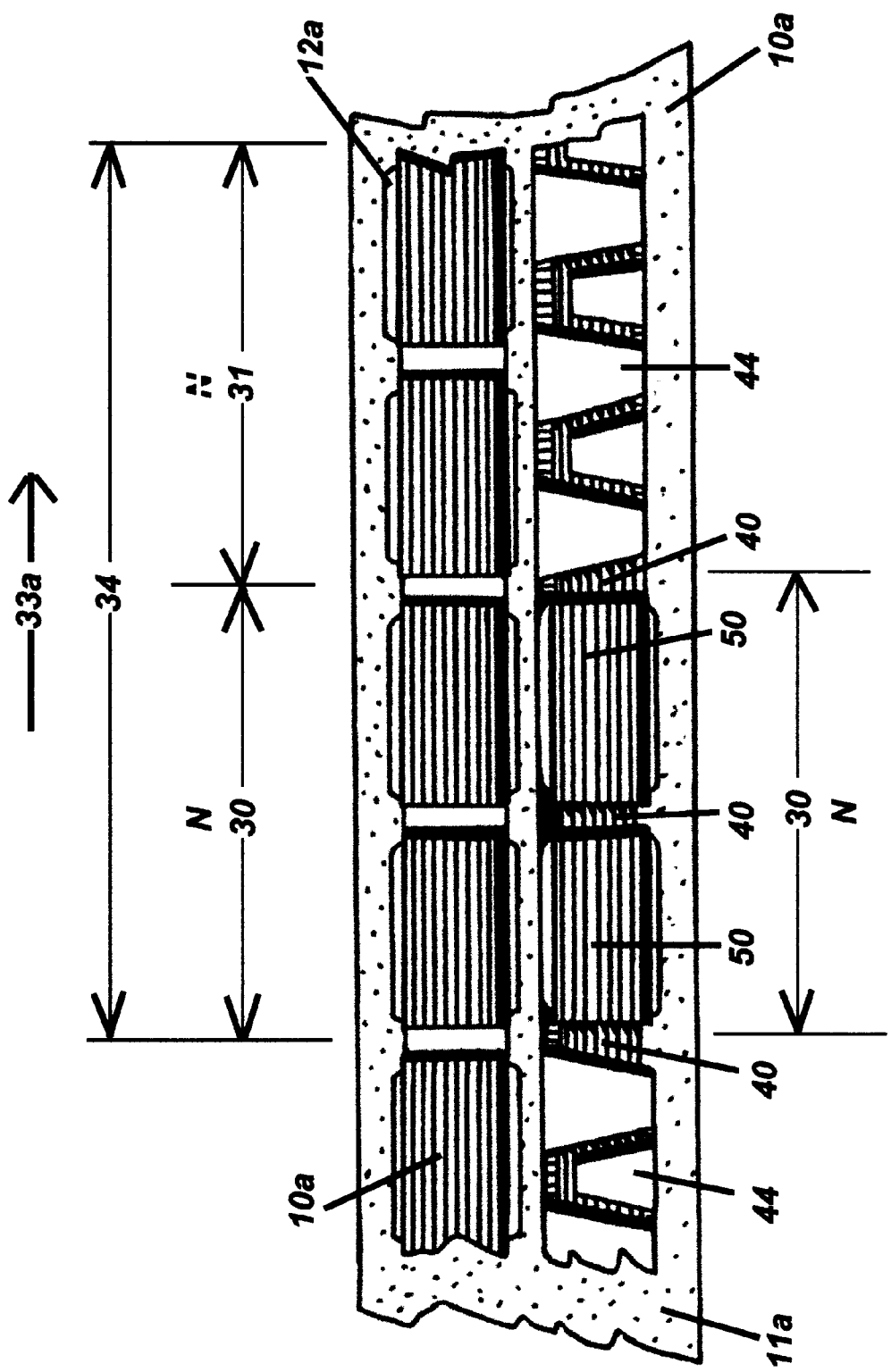

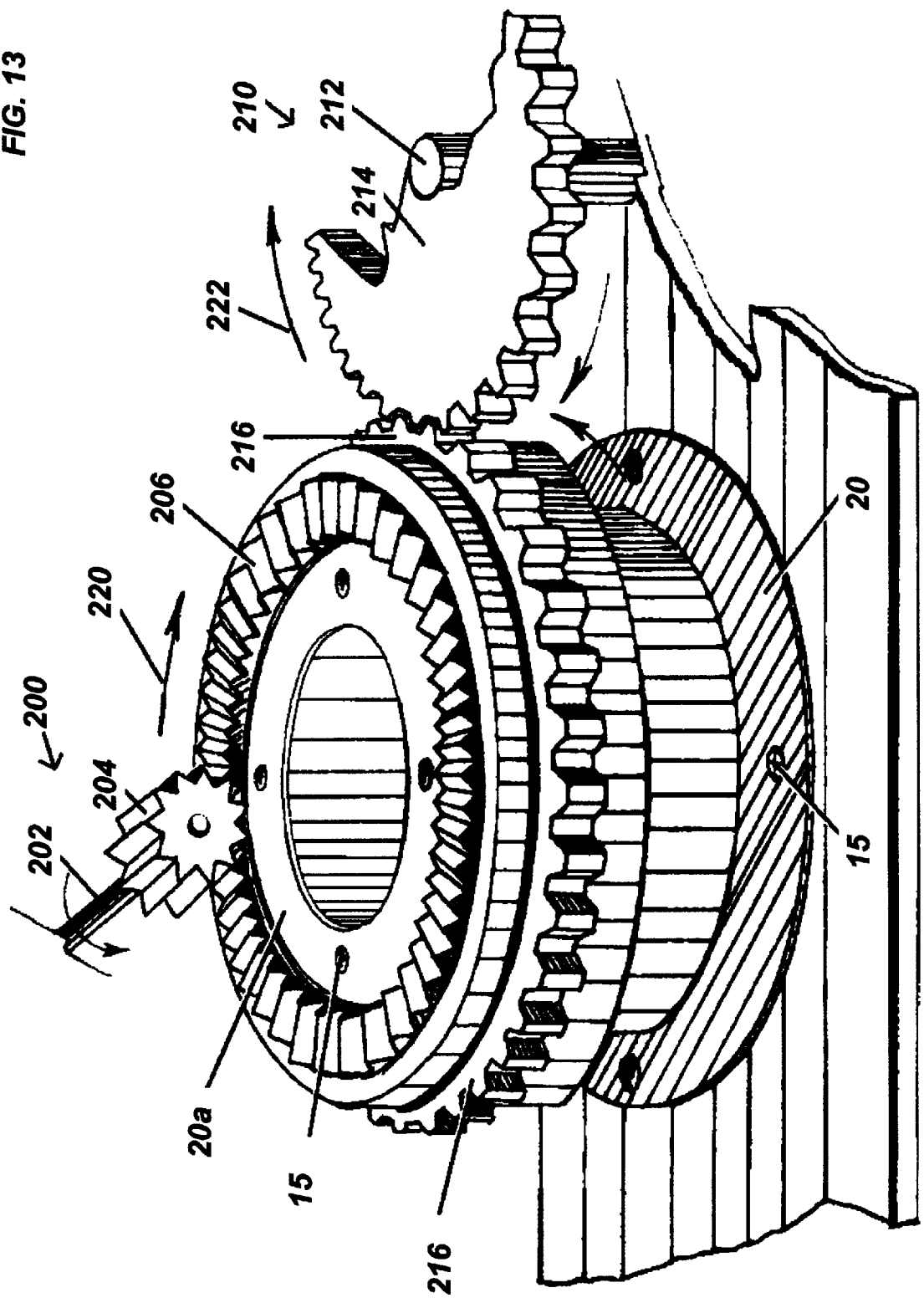

AXLE-LESS ELECTROMAGNETIC ROTATING ASSEMBLY

BACKGROUND OF THE INVENTION

1. Field of the Invention

This invention relates to an electromagnetic rotating machine or assembly in the form of either a motor, generator or combination thereof, which are specifically structured to eliminate the need or requirement of a central axle or support shaft, through the provision of one or more annularly configured rotary assemblies disposed in concentrically surrounding relation to an annularly configured stator assembly.

2. Description of the Related Art

It would be difficult to overestimate the role that electric machinery plays in modern, industrialized civilization. Virtually all electrical energy utilized today is produced by means of electric generators run by steam or by water power. Aside from lighting and heating applications, the vast bulk of energy is transformed into useful work by various types of electrical motors in industrial, transportation and domestic applications.

Electric rotating machinery may be conveniently classified into three main groups, those that generate or operate on direct current, those that generate or operate on alternating current and converters. The latter group of machinery comprises rotating devises which change alternating current to direct current or vice versa, or which change the frequency of alternating current. It is, of course, basic knowledge that rotating electrical or electromagnetic machines that transfer either mechanical energy to electrical energy or electrical energy to mechanical energy are respectively known as generators and motors. Basically, the electric generator operates on the principle of electromagnetic induction. More specifically, a conductor moving through a magnetic field or alternately a magnetic field moving through a conductor, induces an electromagnetic force in the conductor. Conversely, electrical motors work because a mechanical force is exerted on a current carrying conductor when it is placed at right angles to a magnetic field.

Electromagnetic force (EMF) is the electric energy commonly developed from a generator and is usually referred to as the electric potential difference, measured in volts and in reality is not truly a force. EMF is related to electric force in the sense that it is the energy required to carry a unit of positive charge once around a closed circuit. This is the product of electric intensity or field strength measured as force per unit charge and the distance traveled around the closed circuit. Voltage, whether as a result of EMF or electric potential is a measure of the ability of a system to do work on a unit amount of charge by electrical means. Devices for developing or changing EMF or potential include generators. As set forth above, a generator is an assembly that converts mechanical energy into electrical energy by the rotation of an armature, which contains conductors, through an existing magnetic field. A voltage is induced in the moving conductors by electromagnetic induction. In order for voltage to be generated, relative motion must exist between the conductors and the magnetic field. In typical fashion, conventional electrical machinery involves an engine, motor or turbine used or interconnected to turn or rotate a centrally connected armature shaft.

A direct current (DC) motor consists of two basic parts: a field frame assembly and an armature assembly. The armature, or rotor, rotates in a magnetic field that acts upon current carrying conductors or wires. The motor operates to convert electrical energy into mechanical movement because a coil of wire through which current is flowing will rotate (or move) when placed within a magnetic field, until the coil aligns itself with the magnetic field, in terms of unlike polarities being aligned. At that point just before rotation would start, due to unlike polarities being aligned, brushes and a commutator structure are used to reverse the current in the coil. This commutator action causes the coil to continue to rotate due to a reversing of the polarities. The amount of torque developed in the coil depends on the number of turns of the wire or conductor in the coil and the position of the coil in the magnetic field. Since there is torque acting on each turn of the coil, the greater the number of turns, the greater the torque.

In most motors the magnetic field is furnished by the provision of an electromagnet which can be made much more powerful than that of a typical permanent magnet structure. The current used to energize the electromagnet typically comes from the same source that supplies current to the armature. Alternating current (AC) motors are more widely used than DC motors because most utility companies distribute only alternating current electric power.

The first commercial electrical power installation in the United States was constructed in the latter part of the nineteenth century. During the first part of the twentieth century, only approximately 10 percent of the total energy generated in the United States was converted into electricity. However, by 1995 electrical power amounted to over 40 percent of the total of energy converted and 50 percent of the energy used for applications other than transportation, which of course is dominated by the internal combustion engine.

There are two main types of electrical generators. These are direct current generators and alternating current generators. The latter type also being known as alternators. The DC generator rotates conductors in a stationary magnetic field. Alternating current generators rotate a magnetic field that is cut by the stationary conductors. Current induced in the conductors of all generator types is an alternating current. The current taken from the generator, however, may be either AC or DC, depending upon the structural design thereof. The strength of the voltage induced in the conductors depends on its speed and strength of the magnetic field. The magnetic field may be furnished by permanent magnets, as set forth above, or by current flowing through the field core to form an electromagnet. When the ends of the conductor are connected to form a complete circuit, the induced voltage causes a current to flow into the external circuit for any of a wide variety of practical applications, as well known and generally set forth above.

Direct current generators have a commutator mounted on one end of a central armature shaft. The commutator rectifies or changes the alternating current in the conductors to a direct current. Brushes mounted in holders ride on the rotating commutator and carry direct current from the commutator to the external load circuit. In an alternator or alternating current generator, the armature coils or stationary conductors are held in slots in the alternator frame. The field coils are wound on poles or slots and disposed around the rotary shaft. The assembly that contains the stationary conductors is, as set forth above, known as the stator. The assembly that includes the rotary poles and field coils is, of course, termed the rotor. Most alternators use brushes and slip rings on the rotor to pass direct current to the field. Some alternators do not use any type of brushes or slip rings.

The basic field of electromagnetic rotating machinery, as set forth above, whether considering motors or generators, commonly involves the use of a central axle or support shaft used to support a centrally disposed stator or armature. While such a component has been well recognized as an integral part of electromagnetic machinery, (motors and generators) of the type set forth herein, it does include certain inherent disadvantages directly affecting the physical and practical applications of such machinery. Also, common to all known motors and/or generators is the specific inclusion of a contained and/or inwardly directed magnetic field wherein the magnets or electromagnets generating such magnetic field are located adjacent to an outer periphery of the motor structure and face inwardly so as to create the aforementioned magnetic field or magnetic lines of flux. Accordingly, in these types of motors/generators the ability expand the size thereof is extremely limited in that the existence of a central axle or supporting shaft must also have its dimensions increased thereby significantly adding to the weight and diminishing the versatility in terms of varying the overall configuration of such known or prior art devices.

SUMMARY OF THE INVENTION

The present invention is directed to an electric or electromagnetic rotating assembly or machine which, in the various embodiments, may be in the form of an alternating current motor, a direct current motor, an alternating current generator (alternator) a direct current generator or, as will be explained in greater detail hereinafter, a combination motor/generator. An important feature of each of the embodiments of the present invention, as also to be pointed out in greater detail hereinafter, is the cooperative structuring of a stator assembly in operative, spaced relation to one or more rotor assemblies and specifically wherein the electric rotating assembly of present invention, defined thereby, is absent a central rotary axle or shaft typically found in known electric motors or generators and used to support or have mounted thereon the centrally disposed stator or armature. Therefore, the various embodiments of the present invention are extremely versatile and overcome significant problems associated with known electric motors and/or generators incorporating a central axle or shaft, in terms of versatility in adapting to a variety of practical applications. More specifically, the electric or electromagnetic rotating assembly of the present invention, in at least one preferred embodiment, comprises a stator assembly including spaced apart stator portions each of which comprise one or more conductive segments. The conductive segments of each stator portion are, in at least somewhat typical fashion, formed of a permanent magnet or alternately an electromagnet, the latter being preferred in high output motors used either domestically or for industrial purposes. In addition, the aforementioned preferred embodiment includes at least one but in some instances a plurality of rotor assemblies. The use of one rotor assembly comprises a plurality of conductive segments through which an electric current may be directed when the preferred embodiment referred to, serves as a motor. An important feature of the various preferred embodiments of the present invention comprises the one or more rotor assemblies defined by the plurality of conductive segments disposed in adjacent, continuous relation to one another and further disposed in an annular configuration. In addition the aforementioned stator assembly also preferably comprises an annular configuration which is mounted in concentrically surrounded relation by the rotor assembly. The separation or predetermined spacing between the stator assembly and the at least one rotor assembly defines the operative air gap. The annular configuration of the stator assembly which may or may not include a central opening which in this specific embodiment said central opening is absent the connection, mounting or disposition of any centrally disposed connected axle or supporting shaft. The annular configuration of the one or more rotor assemblies is further defined by the open central portion in which the stator assembly is mounted, as set forth above.

An important feature of the present invention is the structuring and disposition of the stator or field portion of the invention such that the generated magnetic field is directed "outwardly" and is, therefore, not enclosed. As set forth above, conventional motor/generator structures each have the existing field directed inwardly towards the center of the motor device thereby defining an enclosed magnetic field. To the contrary, the stator or field generator is directed outwardly towards the outer periphery of the motor device defining the electric rotating assembly of the present invention and towards the one or more rotor assemblies deposed in surrounding relation to the field or stator.

A support structure is provided in a structural configuration which preferably assumes a somewhat cooperative annular configuration, which of course may vary depending upon the specific practical application to which the motor or generator defined by the various embodiments of the subject invention, may be adapted. The support structure may comprise a supporting core or other structural embodiment and may or may not further include a surrounding housing. Further, the stator assembly is generally fixedly secured to or mounted on the support structure and/or within the aforementioned housing and the one or more rotor assemblies are movably mounted on the support structure and/or within the enclosing housing defining a part of the support structure. Also attached to the support structure or enclosing housing is an appropriately structured commutation system including a commutator structure attached to the rotor as well as a plurality of brushes to establish electrical contact with the commutator segments. Naturally, the provision and overall structure of the commutation system, including the aforementioned brushes, would depend on whether the particular embodiment of the electric rotating assembly of the present invention is in the form of an alternating current or direct current motor or generator.

Another important feature of the present invention, particularly associated with the support structure and/or the included housing for the combined stator assembly and one or more rotor assemblies, includes the provision of "axial" bearings. Axial bearings, of the type to be described in greater detail hereinafter, are designed and disposed to moveably and more specifically rotationally mount the one or more rotor assemblies on the support structure or housing so as to allow rotation thereof relative to one another and to the stator assembly which, as set forth above, is fixedly secured to the support structure or housing. Preferred examples of the type of axial bearings which may be utilized and/or structurally adapted for use with the various preferred embodiments of the present invention include axial roller bearings, axial nylon bushings, axial bushings formed of a composite material, axial sleeve bearings, etc. The various embodiments of the present invention are also adapted for use with more exotic bearing systems or assemblies which may include magnetic levitation which produces repelling magnetic forces between collectively movable components of the various embodiments of the present invention.

When a plurality of rotor assemblies are used in operative disposition relative to a common stator assembly, such rotor assemblies are disposed in a stacked array. The various embodiments to be described hereinafter more specifically disclose each of the plurality of rotor assemblies being rotationally mounted on the support structure or housing relative to one another, such that a "multi-rotor" motor assembly is defined. Each of the rotationally mounted rotors may rotate at a different speed and/or may be structured to deliver a different torque. Alternately, utilization of a plurality of rotor assemblies may incorporate at least two adjacently positioned ones of such plurality of rotor assemblies fixedly secured to one another so as to rotate together about the interior, concentrically disposed, common stator assembly. Another feature of such an embodiment would be one of the rotor assemblies operatively structured to define a motor wherein another rotor assembly, connected thereto, would define the armature of a generator or alternator. The concurrent rotation of both of these rotor assemblies about a common stator assembly would allow for the rotor assembly defining the motor component to provide the mechanical force used to drive or more specifically rotate the rotor assembly defining the generator and through which an induced voltage may be developed. As set forth above, an applicable commutator assembly or structure is utilized for directing current through the various conductive segments defining the motor rotor assembly as well as removing the induced voltage from the generator rotor assembly.

Yet other features of the present invention, specifically relating to the stator assembly, includes the various stator portions being arranged in spaced apart, opposite relation to one another (180 degrees) for multiples of dual stator systems or the utilization of three stator portions or multiples thereof arranged at 120 degree spacings from one another. Other similar and generally equivalently structured stator assemblies may differ in terms of spacings between the stator portions. As emphasized in greater detail hereinafter, an important structural feature common to each of the various embodiments of the present invention is the provision of the stator portions arranged such that the magnetic field is generated to extend outwardly towards the outer periphery of the embodiment from the stator to the one or more rotors mounted. This, as set forth above and hereinafter, eliminates what has been referred to as an "enclosed magnetic field" which, as set forth above, has a severe limiting affect on the versatility of conventional or known generator/motor designs in terms of increasing the overall size and configuration particularly due to the fact that such conventional generator/motor designs incorporate a central axle or support shaft not found in the various embodiments of the present invention.

When the various embodiments of the present invention are used to define a generator assembly, there are three basic types involved. TYPE I would comprise an annularly shaped rotor including generating coils and defining a generating armature rotating about an inner, concentrically disposed and surrounded stator assembly. In this TYPE I, electric energy or voltage is induced into the outer rotor assembly. In TYPE II an annularly configured rotor assembly comprising a plurality of permanent magnets or electromagnets, which define the field structure, is disposed in concentrically surrounding relation to an inner stator assembly. The inner stator assembly comprises a plurality of generating coils defining the static armature. In this TYPE II embodiment electrical energy or voltage is induced in the electrical conductors which are part of the stator assembly mounted within the interior of the rotor assembly, as set forth above. TYPE III is directed to an assisting structure comprising the insertion of conductive segments of a motor's rotary assembly, generally of the type set forth above, within the associated, fixedly attached rotor assembly associated with the generator structure. The conductive segments inserted within the generator's rotor assembly are effective duplicates of the plurality of conductive segments defining the rotary assembly of the attached motor's rotor.

It should be apparent from the above summarized discussion that in each of the preferred embodiments of the present invention the non-existence of a central axle or supporting shaft differs from a known motor/generator structures and further wherein a plurality of rotor assemblies may be fixed or moveable relative to one another and each of such plurality of rotary assemblies may be operable in cooperation with the magnetic flux generated by a common stator assembly disposed in concentrically surrounded relation by the plurality of rotor assemblies. In addition, when a plurality of rotor assemblies are utilized and wherein such plurality of rotor assemblies are moveable relative to one another in surrounding relation to a common, surrounded stator assembly, the plurality of rotor assemblies may rotate at different speeds relative to one another and to the common stator assembly and may rotate in opposite directions relative to one another and to a common stator assembly. In addition, different power takeoffs may be located exteriorly of the housing or support device and/or on the exterior of the individual ones of the plurality of rotor assemblies such that each rotor assembly may be drivingly connected to a different power takeoff.

BRIEF DESCRIPTION OF THE DRAWINGS

FIG. 9 is a sectional view in partial cutaway of yet another preferred embodiment of the present invention.

FIG. 9A is a schematic representation relating to the operational characteristics of the embodiment of FIG. 9.

FIG. 9B is a schematic representation of certain operational characteristics of the embodiment of FIG. 9.

FIG. 9C is a schematic representation of certain operational characteristics of the embodiment of FIG. 9.

FIG. 12 is a longitudinal sectional view in partial cutaway and schematic form showing details and operational characteristics of the embodiment of FIGS. 6 and 7.

FIG. 13 is a perspective view in partial cutaway showing the exterior of electric rotating assembly of the present invention incorporating at least two rotor assemblies each of which is drivingly connected so as to provide driving force to different, exteriorly located power takeoff devices.

DETAILED DESCRIPTION OF THE PREFERRED EMBODIMENT

Figure 1:
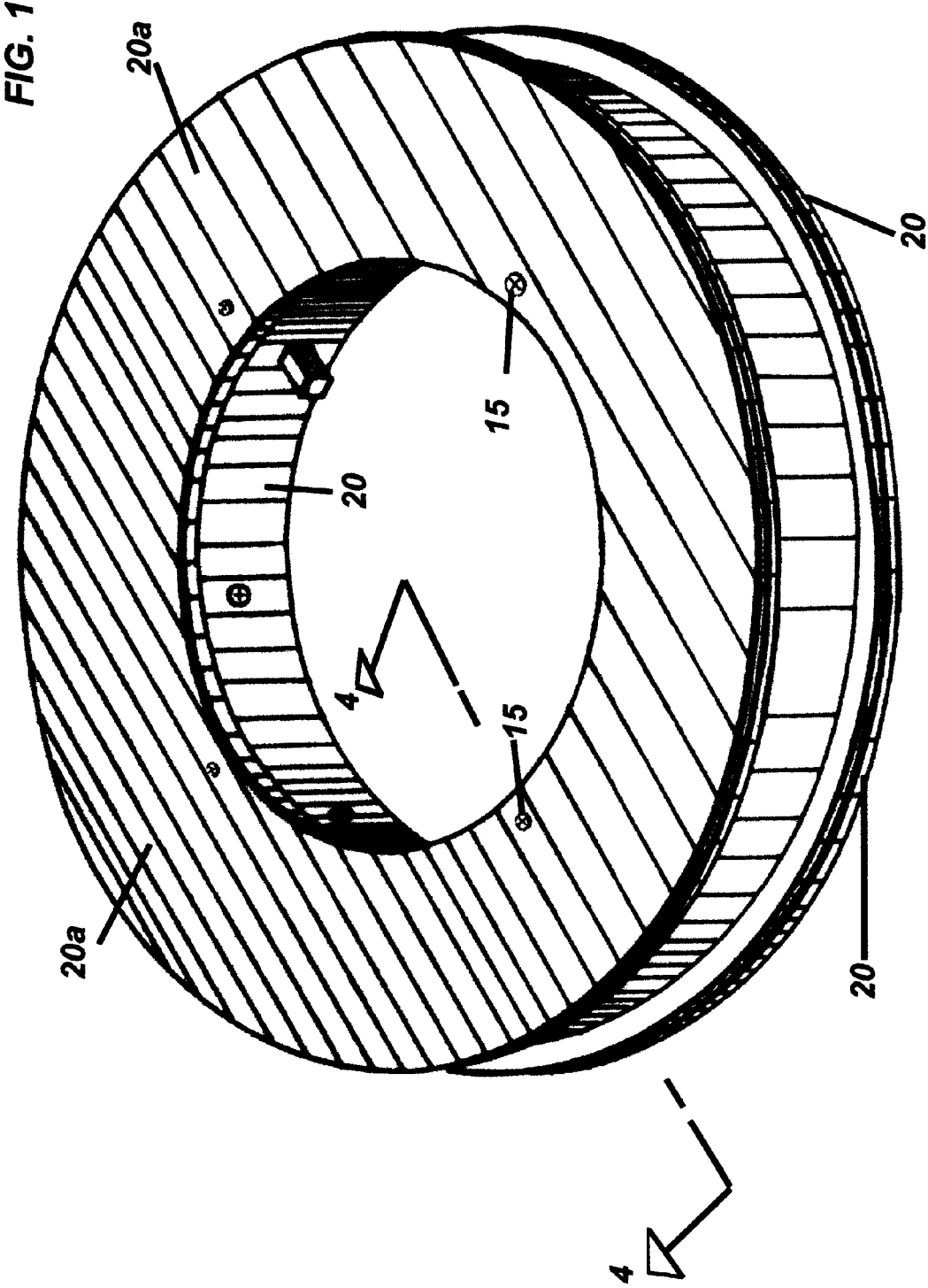
FIG. 1 is a perspective view of the exterior of a housing of one embodiment of an electromagnetic rotating assembly of the present invention.

The present invention is directed towards an electric rotating engine or assembly in the form of a motor, generator or combination of both, depending upon the specific embodiments applied. An important feature of the various preferred embodiments of the present invention is the ability to expand the overall configuration of the motor and/or generator in terms of varying the radius or diameter particularly based on the fact that the electric rotating assembly of the present invention is absent a central axle or rotary shaft commonly found in prior art motor/generator assemblies. Therefore, the term "axle-less" is meant to include the electric rotating assembly of the present invention being without a centrally disposed rotary shaft or axle which is normally disposed, in the aforementioned prior art devises, to support and/or be connected to an innermost component, typically a stator or rotor structure.

To the contrary, the present invention comprises one "commonly shared" stator assembly having an annular configuration which may or may not include a central opening and disposed, structured, configured and dimensioned in cooperation with at least one but in certain embodiments, a plurality of rotor assemblies mounted exteriorly of the annularly configured stator assembly and in concentrically surrounding relation thereto. The absence of a central axle or shaft, which renders the electric rotating assembly of the present invention "axle-less", allows the aforementioned variance in the dimension of the radius and/or diameter so as to accommodate an almost infinite number of practical applications depending upon the operating characteristics of the motor or generator, incorporating the structural design of the present invention, which are intended or desired. Therefore, the present invention represents a different interaction between the one or more annularly configured rotor assemblies and a centrally disposed concentrically surrounded stator assembly operatively positioned common to the one or more rotor assemblies. Such different interaction and overall structural configuration was determined after hours of experimental, laboratory work.

In conventional motors incorporating a stator structure typically including spaced apart substantially opposed stator segments respectively comprising a south (S) and a north (N)polarity, wherein the stator segments are disposed in spaced apart, substantially opposing relation to one another generally at a 180 degree spacing, the armature or rotor assembly associated therewith travels within an enclosed magnetic field from a repelling pole to an attracting pole. Forces or impulses are directed to the armature at approximate spacings of 180 degrees rotation. This, of course, corresponds to the location of the N and S stator segments, as set forth above.

In the axle-less motors/generators of the present invention a stator assembly is provided with a plurality of conductive segments disposed about the periphery and cooperatively defining a plurality of N–S poles in adjacent position to one another. This serves to achieve a "repulsion-attraction" force on the one or more rotor assemblies in relatively short sequences. These are hereinafter termed "throw out" sequences extending along the continuous, annularly configured length assumed by the plurality of conductive segments which define the stator assembly in the motors/generators of the present invention. Therefore, the circumferential size of the stator assembly and accompanying, cooperatively disposed one or more rotor assemblies determines the amount of conductive segments or stator portions which may be arranged on the interior of the moving rotor assembly or assemblies. This in turn affects the operative performance of the motor/generators which allows a variance in torque, speed or other operating characteristics. More specifically the short repulsion-attraction "throw out" sequences are provided in proportion to the aforementioned circumference and diameter of the stator assembly. Based on the above, the torque of the various embodiments could be regulated by regulating the number of interacting fields (increasing or decreasing the number of conductive segments) provided on the one or more rotor assemblies and the single stator assembly. In addition, increasing the area of the interacting magnetic field (flux) preferably by increasing the longitudinal dimension will in effect increase the speed or RPM of the one or more rotor assemblies.

The various preferred embodiments of the present invention are shown in the accompanying figures.

First, with reference to the preferred embodiment of FIGS. 1 through 5, the present invention is directed to an axle-less rotary motor having a housing which includes a top cover 20a secured by one or more bolts or like connectors 15 to the remainder of the housing. The housing, as will be more clear based on the description provided hereinafter, may comprise a part of a support structure. The lower portion of the housing or base portion 20 is also secured by appropriately positioned connector members 15 and is disposed in spaced apart relation to the top cover 20a. With primary reference to FIGS. 2 through 5, the interior and operative components of the motor assembly comprises a single stator assembly generally indicated as 9 including an inner, annular support structure 20 which may be also considered a part of the housing and the support structure. The stator assembly 9 comprises the stator core 23 having mounted thereon a plurality of conductive segments each of which are defined by stator field windings 24 mounted on and supported by a stator core or yoke 23.

A single rotor assembly comprises an outer rotor core or yoke 10 supported or interconnected to an outer ring structure 11. The single rotor assembly comprises a plurality of spaced apart but immediately adjacent conductive segments, which in the embodiment of FIGS. 1 through 5, are defined by the conductive material core or yoke 10 having windings 12 mounted thereon as shown. The segments are arranged in a continuous annular configuration or array such that the entire rotor assembly is defined by an annular configuration. The annular configuration of the rotor assembly of this embodiment further defines a central opening or open portion as at 100, sufficiently dimensioned and configured to be disposed in operative, surrounding and concentric relation to the single stator assembly 9. In such an operative disposition as shown in FIGS. 3, 4 and 5, an air gap 102 is defined there between. Further, relating to the air gap structure and with specific reference to FIG. 5, the transverse dimension or width of the air gap 102 may vary between the points 36 and 37 and 36a and 37a, but is consistent along its length.

Figure 2:
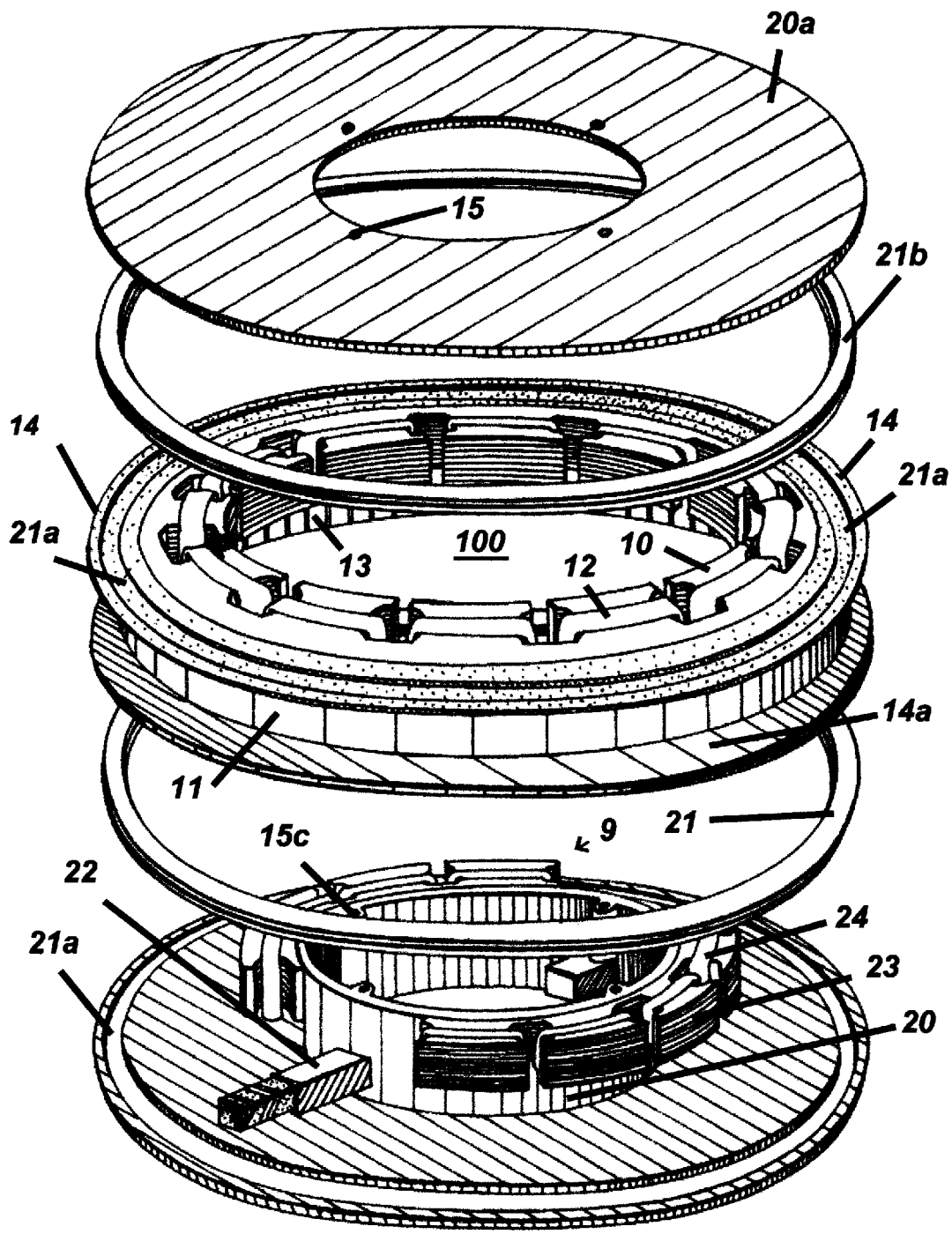
FIG. 2 is a perspective view in exploded form showing interior components of the embodiment of FIG. 1.
Figure 3:
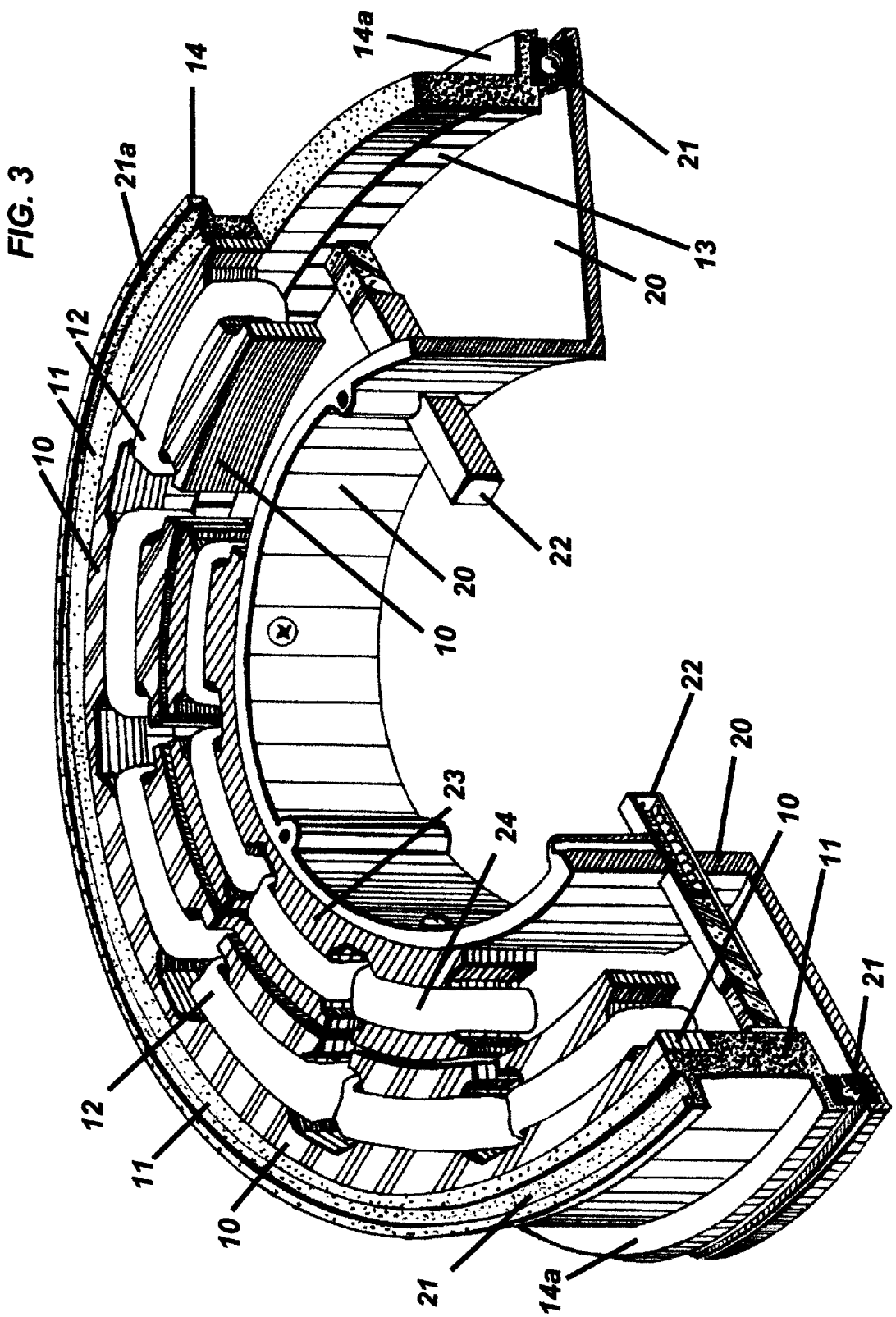
FIG. 3 is a perspective view in partial cutaway and section of the embodiment of FIGS. 1 and 2.
Figure 4:
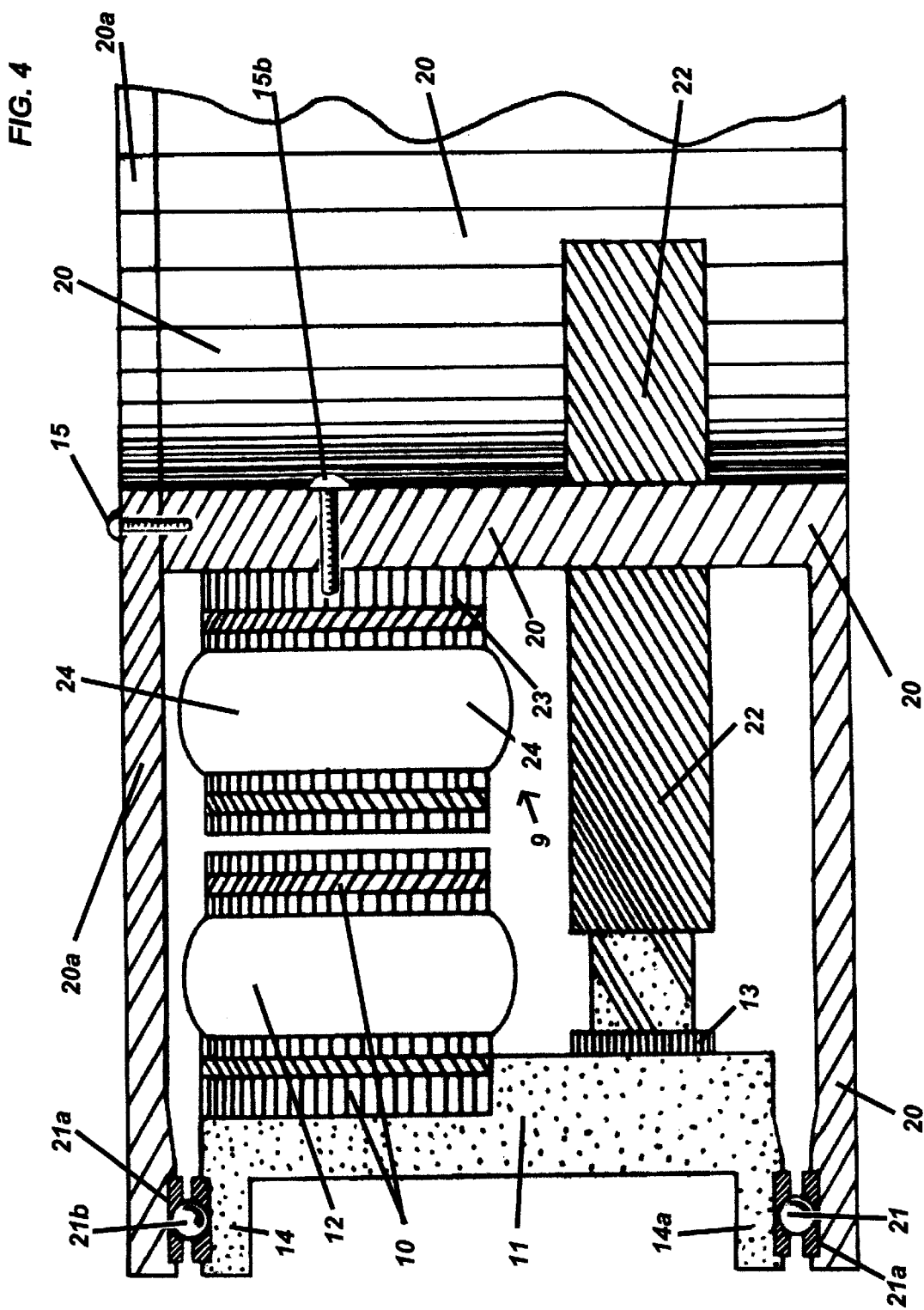
FIG. 4 is a sectional view in partial cutaway of the embodiment of FIGS. 1 through 3.
Figure 5:
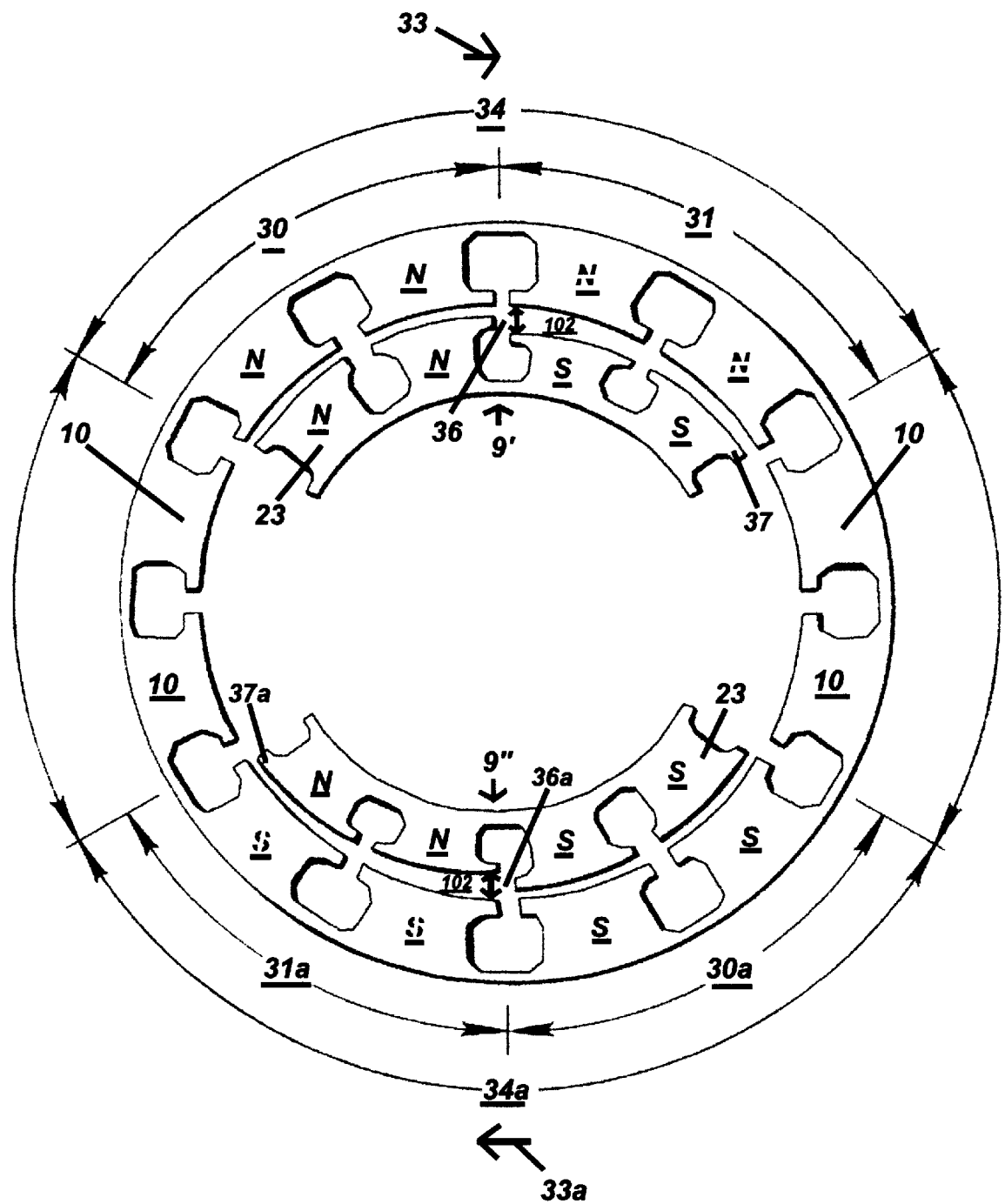
FIG. 5 is a top schematic representation of one preferred embodiment of the electromagnetic rotating assembly of the present invention.

FIG. 2 is an exploded view of the various components of the preferred embodiment of FIGS. 1 through 5 and includes the top cover 20a of the main supporting structure, being a part of the housing and including an insert seat or groove 21a designed to house a mounting means in the form of an axial bearing 21b. Similarly the bottom cover or portion of the housing which also defines a part of the support structure as at 20 includes the annular groove 21*a* designed to receive the bearing 21. It is further emphasized that a variety of bearing structures could be substituted as a mounting means including superconductor magnetic field levitation. It should be readily apparent, therefore, the stator 9 is fixedly secured to the housing or more specifically to the support portion 20 of the housing and is surrounded by the movably mounted rotor assembly by being positioned within the central opening 100. The rotational movement of the rotor assembly is accomplished due to the precise placement of the annularly disposed axial bearings 21 and 21*b* as explained. The outer ring structure 11 is inwardly fixed or otherwise secured to the axial bearing lower flange 14 in which the groove 21*a* is formed. The outer ring 11 is preferably formed from an insulating material such as a ceramic material or the like but with strength enough to carry on take off power.

FIG. 3 represents an isometric view in partial cutaway and section showing the interaction and respective, cooperative positioning of the various components of this embodiment of the present invention in their assembled form. As shown, commutators 13 are mounted on the rotor assembly and are engaged by oppositely disposed spaced apart brush assemblies 22. Interconnection of the commutator sections 13 with various conductive segments defined by the core 10 and the windings 12 may be made by any applicable connection such as by conductive wiring being placed within the outer ring structure 11. As clearly shown in FIG. 3 and as referred to above, bearing structures 21 are designed to be positioned as shown to accomplish the moveable attachment or mounting of the one rotary assembly on the housing such as on the lower supporting structure 20 so as to accomplish rotation thereof relative to the stator assembly generally indicated as 9.

As shown in FIG. 4, the outer ring structure 11 is rotatably supported by the upper and lower axial bearings 21*b* and 21 through the outer ring structure flanges 14 and 14*a* having the insert seat grooves 21*a* to engage respectively each of the axial bearings as shown.

FIG. 5 is a top view of the armature core 10, relative to the two stator portions 9' and 9" defining the single stator assembly 9 as shown in FIG. 2. The core portions 23 of stator portions 9' and 9" are shown, for purposes of clarity, without the stator field windings and structural support. The motor armature assembly shown in FIG. 5 based on the inclusion of twelve conductive segments disposed continuously along the annular, continuous length of the one rotor assembly and eight conductive segments formed in spaced apart relation (four segments each in the stator portion 9' and 9") formed in the single stator assembly. The number of conductive segments in the rotor and stator assemblies could, of course, vary depending upon the intended or desired operative characteristics of the resulting motor, incorporating all the important features of this embodiment.

FIG. 5 also schematically demonstrates that the rotor assembly core 10 throws a repulsive force along the rotational path indicated by segment 30 as the same poles N—N are disposed adjacent to one another. A simultaneous attraction occurs along the path segment 31 by the positioning of the conductive segments of opposite polarity N–S. This same interaction occurs at 180 degree spacings along the path segments 30*a* and 31*a* by the various conductive segments of the core 10 of the single rotor assembly engaging the static portion 9". Therefore, a double simultaneous repulsion reaction takes effect, causing the travel of the armature to the closest opposite magnetic field of the stator assembly. However, in order to avoid any "drag" which would have a tendency to slow the rotation of the rotor assembly, current is interrupted and/or regulated such that the end-poles are canceled or switched to S-poles along the path segment 31 in order to avoid attraction between unlike poles. A similar action occurs along path segment 31*a* in order to avoid the aforementioned drag which would inherently occur if the N-pole were to be maintained as the rotor 10 travels in adjacent relation to the S-pole of the stator as at 9' and 9".

In order to increase or affect the attraction stage to the more distant point of the attracting pole of the stator assembly or at points 37 and 37*a,* as shown in FIG. 5, the spacing or transverse dimension of the air gap 101 has been increased to the starting point of the attracting stator poles 36 and 36*a* thereby reducing the electromotive force (EMF). The transverse dimension of the air gap 102 is gradually decreased to its minimum possible dimension at the end of this stage or path of rotation which will serve to increase the EMF at points 37 and 37*a*. Accordingly, dual complete interaction cycles of repulsion-attraction at both sides of the circumference at stages 34 and 34*a* is accomplished. Following the direction of travel indicated by directional arrow 33 and 33*a* of the rotor assembly, from the path segment 30, where it is electro magnetized to assume an N polarity, when armature field travels 180 degrees to a position or path segment 30*a* where the polarity inverts due to the action of the brush and commutator assembly 22 and 13, respectively.

Figure 6:
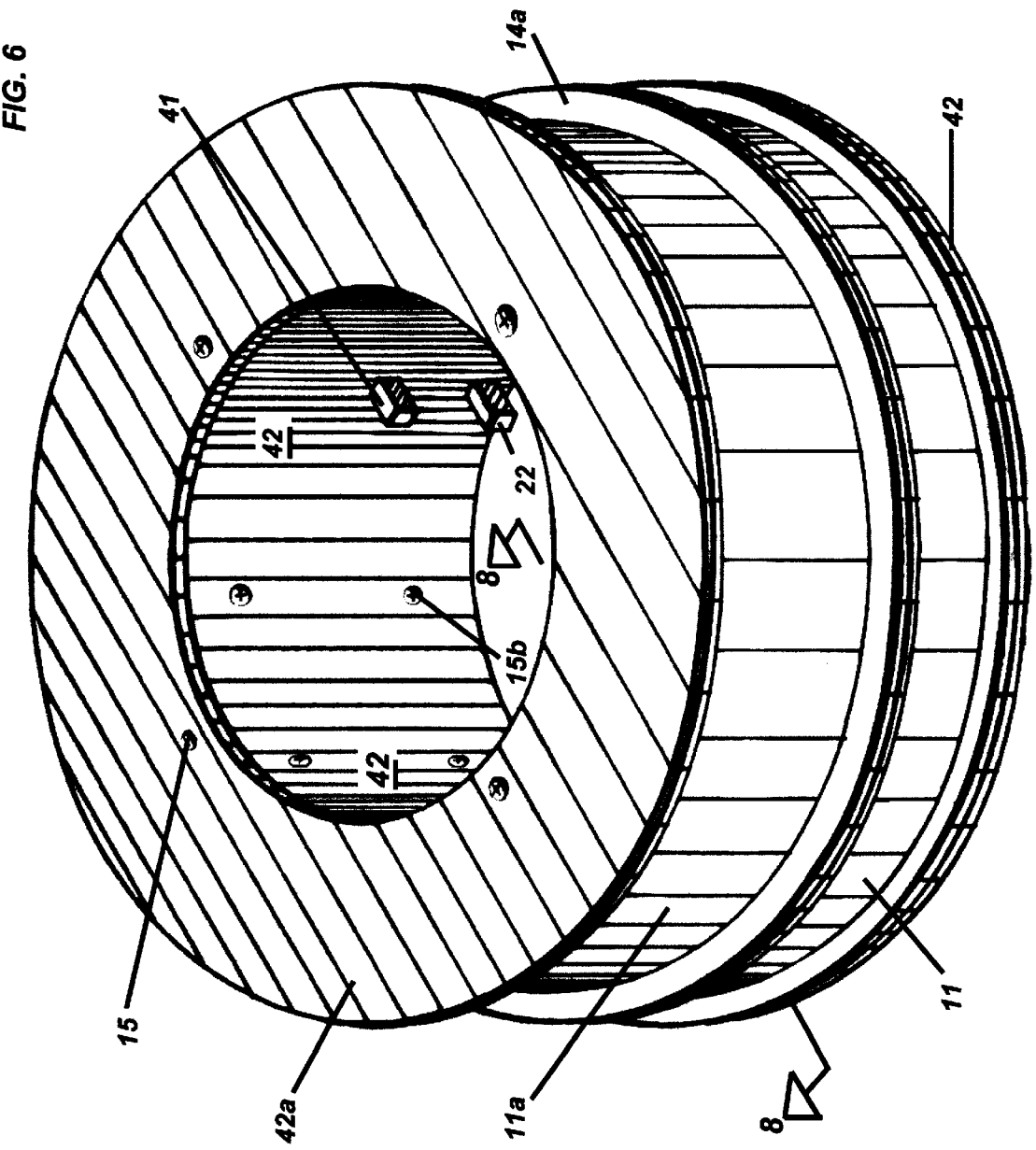
FIG. 6 is a perspective view of the exterior of another preferred embodiment of an electromagnetic rotating assembly of the present invention.
Figure 7:
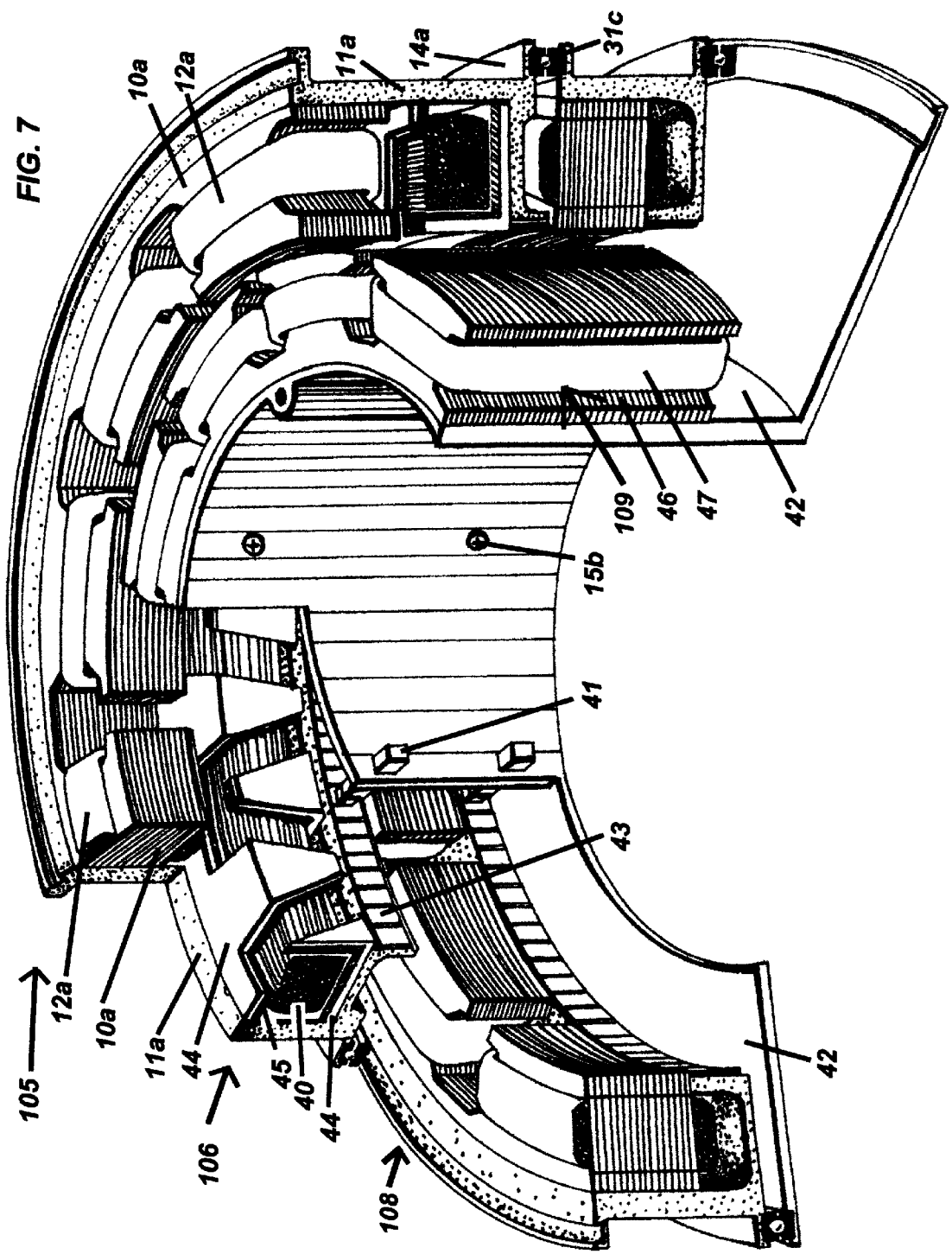
FIG. 7 is a perspective view in section and multi-cutaway of the embodiment of FIG. 6.
Figure 8:
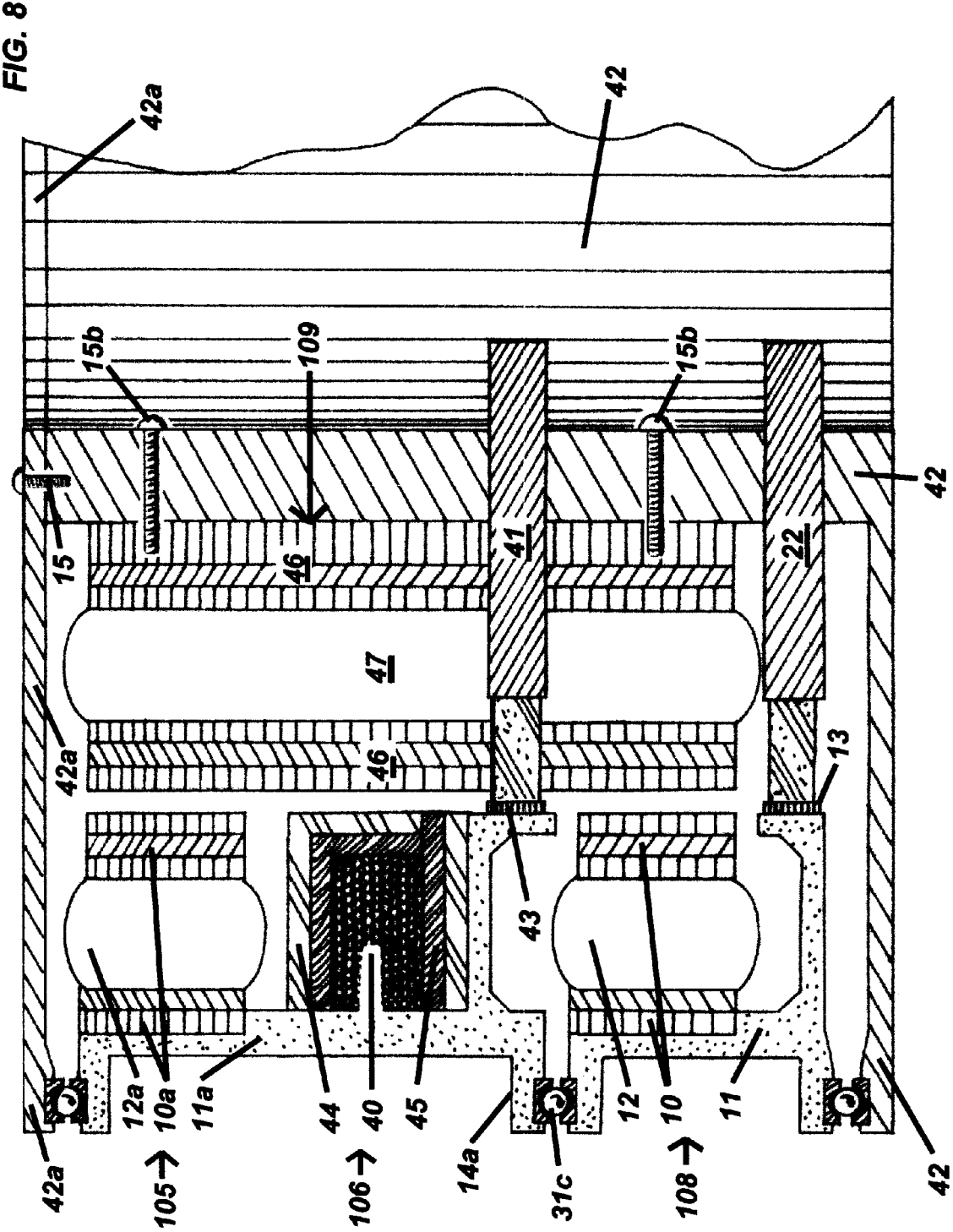
FIG. 8 is a sectional view of the embodiment of FIGS. 6 and 7.

Yet another preferred embodiment is shown in FIGS. 6 through 8. FIG. 6 is an isometric view of an assembled dual rotor assembly motor having a common centrally disposed and concentrically surrounded stator assembly. Of particular importance and features of the embodiments of FIGS. 6 through 8 is the specifically elongated dimension of the primary stator core portion 46 and windings 47 so as to extend along the entire transverse dimension or rotary path of travel of each of the plurality of the rotor assemblies. In this embodiment, the aforementioned plurality of rotor assemblies comprises a first rotor assembly (motor armature) generally indicated as 105 and second rotor assembly (generator armature) generally indicated as 106. These first and second rotor assemblies respectively define the armature or rotor assembly of a motor and generator structure but may be either momentarily or fixedly interconnected to one another so as to rotate together in surrounding, concentric relation about the common stator assembly 109, as described in greater detail hereinafter. The stator assembly 109 includes a common primary stator core portion 46 and plurality of conductive segments each including an elongated winding 47 formed thereon. Combined first and second rotary segments 105 and 106 may also be considered a dual armature system.

A third rotary assembly 108 defines the rotor assembly of a motor and is movably mounted on the housing or support portion 42 as well as being rotational relative to both the stator 109 and the first and second rotary assemblies 105 and 106 previously referred to as the dual motor generator armatures. In order to accomplish relative movement between the rotor assemblies 105, 106 and the third rotor assembly 108, a bearing assembly 31*c* is common to both and is mounted on the support structure flange 14*a* as shown.

With reference to both FIGS. 7 and 8 an upper frame cover 42*a* is attached to the main frame structure 42 through one or more connecting bolts 15 or the like which may vary in number. The common elongated primary stator core portion 46, which is operatively positioned relative to each of the plurality of rotor assemblies 105, 106 and 108 is supported to the main frame structure by the more elongated connecting bolts 15*b*.

The first rotor assembly or motor armature assembly 105 comprises the core 10a and field windings 12a defining each of the plurality of adjacently positioned conductive segments. The electrical excitement of this field by commutators 43 located at the lower section of the outer ring structure 11a are fed current by the upper brush assembly 41 by an applicable electrical connection as set forth above. The generator armature assembly defined by the second rotor assembly 106 comprises the spider generator armature core 44 and an interior insulating member or shield 45 adhered to the spider armature core 44. The insulation shield 45 is provided in order to prevent the generator coil 40 from being short circuited by contact with the conductive material core 44. The first rotor assembly or motor armature 105 will cause the rotation of the generator armature defined by the second rotor assembly 106 since they have a common supporting structure 11a in order to define an interconnection therebetween the connection is not necessarily fixed but may be engaged momentarily by changing the structural configuration of the common support structure 11a. An induced voltage is produced in the rotating generator coil 40 when interacting with the flux or magnetic field created by the stator assembly 109.

It should, of course, be recognized that this structure could effectively be reversed by changing the position of the components and inducing a voltage in the static portion 109.

FIG. 9 is a sectional view in partial cutaway showing another embodiment somewhat similar to the embodiment of FIGS. 6 through 8 but including a plurality of rotor assemblies 120, 122, 124 and 126. In this embodiment the plurality of rotor assemblies are cooperatively positioned in surrounding relation to a "common stator assembly". The common stator assembly, in this particular embodiment, is defined by a common supporting yoke 48 designed to support a plurality of stator portions 23a, 23b, 23c and 23d. Each of these stator portions 23a through 23d are associated with individual windings 24. This common stator assembly includes a longitudinal dimension similar to that of the embodiment of FIG. 7, in terms of the yoke 48 being sufficiently elongated to extend transversely along the entire rotary path of all four of the rotary assemblies of the embodiment of FIG. 9, wherein the stator portions each generate a magnetic field in operative relation to one of the rotor assemblies 120–126. Further, while four rotor assemblies 120, 122, 124 and 126 are shown, the actual number of rotor assemblies could, of course, vary. Further, each of the rotor assemblies are designed to be movably mounted on a support structure 20a and 20b and are also designed to be moveable relative to one another by the additionally provided bearing assemblies 21c as shown at different speeds and/or in different directions. Accordingly, the operative characteristics of each of the rotor assemblies 120, 122, 124 and 126 may vary in terms of operating characteristics specifically including speed (RPM), relative direction of travel (clockwise and counter-clockwise) and torque.

Another feature of the present invention is the angular orientation of the windings 12 and associated core 10 of the various conductive segments of each of the rotor assemblies 120–126 and the cooperative, parallel but angular orientation of the individual and correspondingly positioned stator portions 23a through 23d and their associated windings 24. The common supporting yoke 48 is fixedly attached by conventional bolts or like connectors 15b to the support or housing 20 as indicated above. A plurality of commutator assemblies 13 and cooperative electrically interconnecting brush assemblies 22 may also be provided as shown in order to provide current to the plurality of windings 12 on each of the rotary assemblies 120, 122, 124 and 126. In order to diminish the height of the assembled array of stacked rotor assemblies 120 through 126 certain ones of the conductive segments defined by core 10 and windings 12, as well as their cooperatively positioned core and field windings on the correspondingly positioned stator structures 23a through 23d, are arranged at a common angular orientation. More specifically, the two segments are substantially parallel and the air gap 101' there between has a predetermined transverse dimension as shown throughout the entire rotary path of the respective rotor assemblies 120 through 126. In addition, the rotor assembly 120 has its core 10 and windings 12 arranged generally at a 45 degree angle from a reference orientation or normally upright orientation as represented by the core 10 and windings 12 of the rotor assembly 122. The rotor assembly 124 has its core 10 and windings 12 arranged at an angle of 135 degrees relative to the zero reference angle or upright orientation of the core 10 and windings 12 of the second rotor assembly 122. In addition, the rotor assembly 126 has its core 10 and windings 12 arranged at a 45 degree angle similar to the 45 degree angular orientation of the first rotor assembly 120. This angular orientation may more specifically be referred to as the "interaction plane angle" (IPA) in that the correspondingly positioned stator portions 23d, 23c and 23b as well as their associated windings 24 are all arranged at this same angular orientation to assume the aforementioned parallel orientation and thereby define the IPA.

FIG. 9A represents the imaginary vertical plane of interaction in its cross sectional profile and the reference angles are basically to be used as a guideline locator for the IPA set forth above with specific explanation of the angular orientation of the various cores and associated windings 10 and 12, respectively, of the first, third and fourth rotor assemblies. FIGS. 9B and 9C are schematic representations of similar reference and comparative representations. In particular, FIG. 9C is a schematic representation of the circular or annular path of travel of the various rotor assemblies 120, 122, 124 and 126 as indicated. With reference to FIG. 9C, the IPA of the armature-stator 11e–23a, being at zero degrees, would form a cylindrical section in relation to the complete motor assembly during its rotary path of travel. Armature-stator 11d–23d oriented at a 45 degree IPA would form a positive 45 degree truncated cone generated in the positive or upper part of X-Y plane. The armature-stator 11c–23c located at 135 degree IPA takes the configuration of a negative 45 degree truncated cone located below or in the negative part of the X-Y plane. Also as set forth above, the advantage of this multiple application and use of the various IPA angles of zero degrees (upright), 45 degrees and 135 degrees would be to drastically reduce the overall height of the assembled structure incorporating multi-level rotor assemblies having a plurality of rotor assemblies arranged in a stacked array, wherein the rotor assemblies may be armatures for motors or generators.

Figure 10:
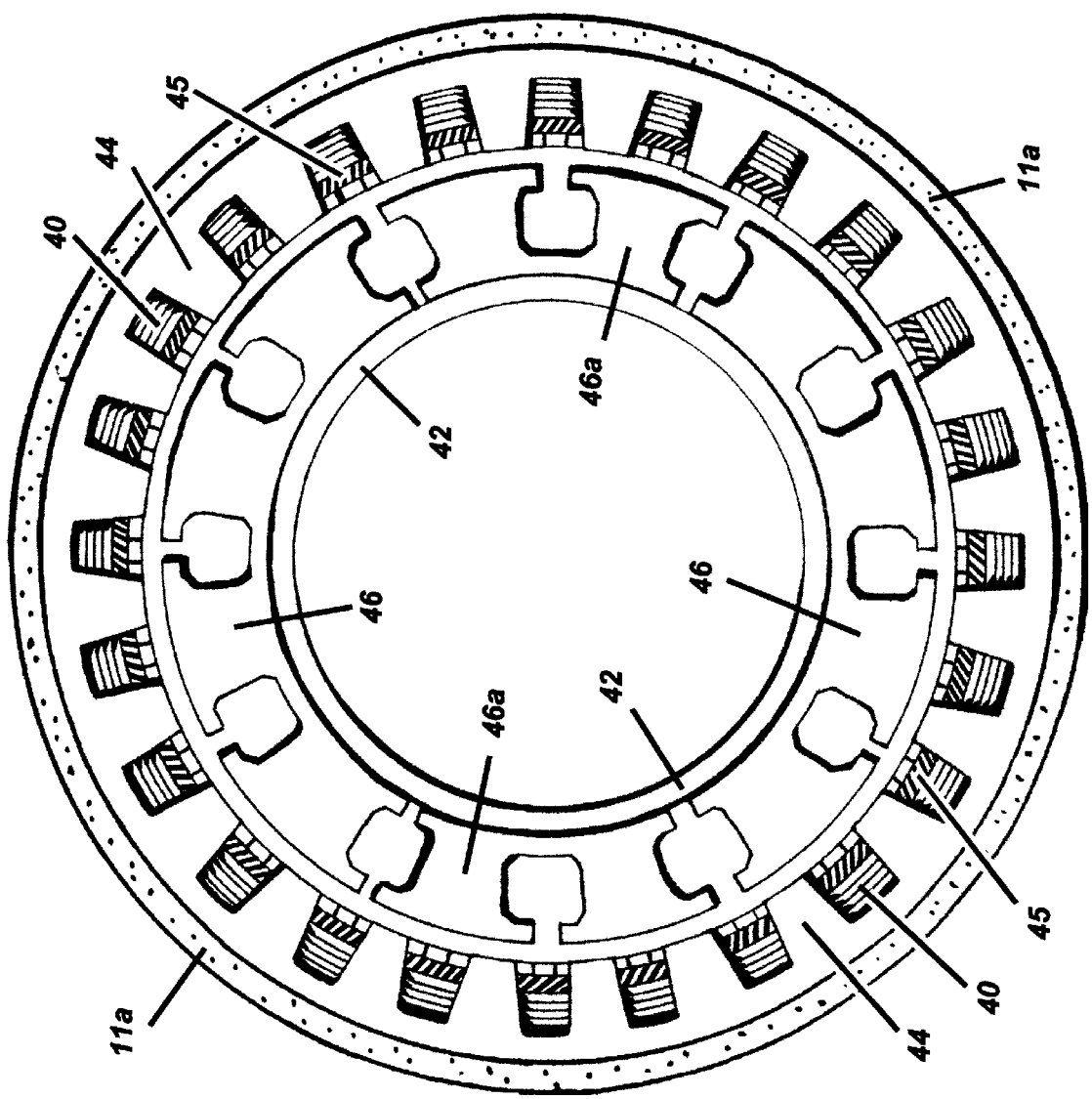
FIG. 10 is a top view showing relative interior components of a portion of the embodiment of FIGS. 6 and 7.

FIG. 10 is directed to an axle-less generator TYPE I structure wherein induced voltage is generated in the outer rotary assembly or what would be equivalent to the rotor (generator armature) assembly 106 in the embodiment of FIG. 7. For purposes of clarity, the structure of FIG. 10 shows the common continuously elongated stator primary stator portion 46 without the common elongated windings 47 and introducing, in the primary stator portion core 46, the secondary stator portion 46a at the generator armature level only. In other words, the inner stator field structure includes main or primary stator portions 46 and additional or inserted secondary stator portions 46a in order to increase the number of conductive segments and thereby affecting the operative characteristics of the formed generator armature by having a plurality of conductive segments now defined by both the primary stator portions 46 and the secondary or supplementary stator rotor portions 46*a* arranged in a continuous annular configuration. Therefore, the stator-field structure is enclosed in a 360 degree array at the generator armature level only.

Figure 11:
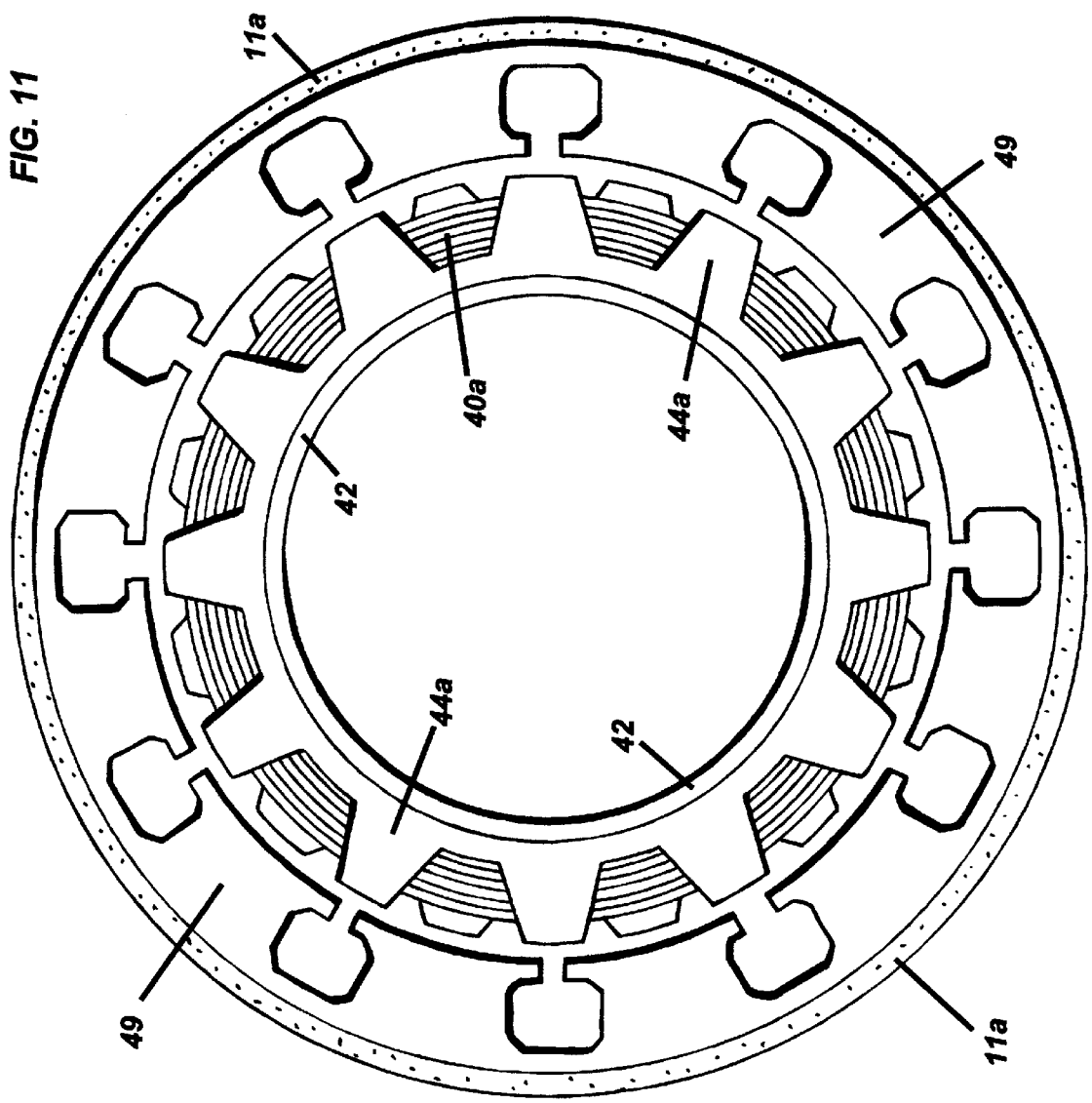
FIG. 11 is a top view in section showing certain details of components of the embodiments of FIGS. 6 and 7.

FIG. 11 represents yet another embodiment of the present invention which may be referred to as a TYPE II axle-less/generator, wherein induced voltage is generated in the static structure through the conductors 40*a*. The conductors 43*a* are surrounded by the spider generator static armature core 44*a* which attached to the main frame or support structure 42 in a fixed manor. FIG. 11 further discloses the elongated outer ring structure 11*a* supporting the rotary field structure core 49, which is a continuous field fed by slip ring and brush assemblies. Such brush assemblies are connected to run from the inner main frame 42, similar to the embodiment of FIG. 7, and the brush assemblies 41 and 22 therein, to make contact with the continuous slip rings (not shown for purposes of clarity) in order to keep the outer rotary field structure constantly energized. While not clearly shown, the inner static portion main frame structure 42 is supporting the spider generator static armature core 44*a* and its generating coil 40*a* and also supports armature core 44*a* and its generating coil 40*a* and also supports the inner stators which are disposed to cooperatively interact with the outer motor armatures and brush assemblies to feed the motor armatures. As pointed out above, this system is the inverse of the operatively oriented structure of the embodiment of FIG. 10.

In the embodiment of FIG. 12 an operative segment or portion of a TYPE III axle-less generator is shown and is defined as an assisting system applicable for use in cooperation with TYPE I or TYPE II axle-less generator as described above. This assisting system as shown in FIG. 12 is used to decrease the load to the prime mover. In the structure of FIG. 12 a strip sequence of a fractional dual axle-less motor/generator armature (similar to FIG. 7) is provided. More specifically, a duplicate segment of the motor armature 50 is inserted into the generator spider armature along side the spider armature core 44. This structure includes an elongated outer ring structure 11*a* supporting the upper motor armature core 10*a* and its field windings 12*a* as well as the spider generator rotary armature core 44 and its generating coil 40. Along path segment 30 in FIG. 12, the motor armature or rotor assembly has been energized to assume an N polarity facing the elongated stator which maintains a steady N polarity. The duplicate segment of the motor armature 50 inserted into the generator armature core 44 (without physically or structurally interrupting the generator coil 40) will be energized to an N polarity simultaneously at and along the path segment or stage 30. A greater EMF will then be produced, creating a greater attraction at stage 31 to the stator, which is now in an S polarity following the rotation segment 33*a* and thereby decreasing the load of the motor armature assembly 10*a*, 12*a*.

This system could also be applied to the axle-less generator TYPE II, inserting the duplicate segments 50 into the inner spider generator static armature core 44*a* to interact with the outer rotating structure field 49 or vice versa. This could be accomplished by inserting the motor armature duplicate segments 50 in sections of the rotary structure fields 49 and extending the inner static motor stators, into the spider generator static armature core 44*a* to interact with the indicated duplicate segments of motor armature 50. This insertion improves considerably the output performance of the motor armature which serves to produce rotating force to the dual motor/generator system.

In operation, one embodiment of the electric rotating assembly of the present invention is shown in FIG. 13 wherein an exterior view represents a first power takeoff generally indicated as 200 including a takeoff shaft 202 and a connecting driven gear 204. The first power takeoff assembly 200 is connected in driven relation by means of a ring gear 206 which is driven by one of a plurality of rotor assemblies of the type shown in the embodiment of FIG. 9. The actual inter connection between the driving ring gear 206 and the rotor assembly (see FIG. 9) to which it is attached is not shown for purposes of clarity but may take any applicable connection.

In addition, FIG. 13 shows a second power takeoff generally indicated as 210 and including a power take off shaft 212 and a driven gear 214 shown in a partial cutaway view. The driven gear 214 of the second power takeoff 210 is drivingly connected to an exterior periphery driven ring gear 216. The ring gear 216 is connected directly to one of the other of plurality of rotor assemblies of the type shown in the embodiment of FIG. 9. It is also important to note that directional arrows 220 and 222 are clearly indicative that the driving ring gear 206 and the driving ring gear 216 each being connected to a different rotor assembly of the type shown in the embodiment of FIG. 9 are rotating in opposite directions and are drivingly engaging so as to provide positive energy or work force to the respective power takeoff assemblies 200 and 210. As set forth above, the power takeoff assemblies 200 and 210 may, of course, be driven at different speeds since, as pointed out throughout description of the various embodiments of the present invention, the relatively movable rotor assemblies of the type shown in the embodiment of FIG. 9 may operate at different speeds (RPM).

What I claim is:

1. An electromagnetic rotating assembly comprising:
   (a) a support structure having a plurality of rotor assemblies moveably mounted thereon and one common stator assembly fixedly mounted on said support assembly,
   (b) said plurality of rotor assemblies comprising at least a first rotor assembly and a second rotor assembly connected to one another and collectively rotatable relative to said stator assembly,
   (c) said plurality of rotor assemblies further comprising a third rotor assembly rotatably mounted relative to said first and second rotor assemblies and said stator assembly,
   (d) said first, second and third rotor assemblies disposed in a substantially stacked array and each comprising an annular configuration including an open interior portion,
   (e) said stator assembly disposed within said open interior portion in concentrically surrounded relation by said first, second and third rotor assemblies,
   (f) said stator assembly comprising a plurality of conductive segments each disposed in spaced relation to said first, second and third rotor assemblies to define an air gap there between; each of said conductive segments of said stator assembly having a sufficient longitudinal dimension to extend along said entire air gap in transverse orientation to each of said first, second and third rotor assemblies, and
   (g) at least one power takeoff assembly connected in driven relation to at least one of said plurality of rotor assemblies and located exteriorly of said plurality of rotor assemblies and said stator assembly.

2. An assembly as recited in claim 1 wherein one of said first and second rotor assemblies comprises a plurality of conductive segments collectively disposed in a continuous, annular array and structured to define an armature of a motor.

3. An assembly as recited in claim 2 wherein the other of said first and second rotor assemblies comprises a plurality of elongated conductors extending along the length thereof and disposed and structured to define an armature of a generator.

4. An assembly as recited in claim 3 wherein said third rotor assembly comprises a plurality of conductive segments collectively disposed in a continuous, angular array and structured to define an armature of a motor;

said third rotor assembly rotatable relative to said first and second rotor assemblies and independent thereof.

5. An assembly as recited in claim 4 wherein the other of said first and second rotor assemblies comprises a plurality of elongated conductors extending continuously along a portion of the length thereof;

said other of said first and second rotor assemblies further comprising at least one conductive segment structured equivalently to said conductive segments of said motor armature and electrically connected thereto.

6. An electric rotating assembly comprising:
(a) a support structure including at least one rotor assembly movably mounted thereon and at least one stator assembly fixedly mounted thereon,
(b) said rotor assembly comprising a plurality of conductive segments disposed in immediately adjacent, spaced relation to one another and collectively disposed in an annular configuration defining an open interior portion,
(c) said stator assembly comprising a plurality of conductive segments wherein predetermined adjacent ones of said conductive segments are of opposite polarity,
(d) said stator assembly disposed within said open interior portion in concentrically surrounded relation by said rotor assembly,
(e) said stator assembly further comprising at least two stator portions spaced apart in substantially opposing relation to one another, each of said stator portions comprising a plurality of said conductive segments extending along the length thereof,
(f) said rotor assembly disposed in spaced relation to said stator assembly to define an air gap between said conductive segments of said rotor assembly and said stator assembly during rotation of said stator assembly; said air gap comprising a varying transverse dimension along the length of each of said stator portions, and
(g) said stator assembly and support structure cooperatively structured to define an axle-less assembly defined by the absence of a centrally disposed shaft.

7. An assembly as recited in claim 6 wherein said one rotor assembly is disposed and structured to project a magnetic field inwardly towards a center portion of said support structure.

8. An assembly as recited in claim 6 wherein said one stator assembly is disposed and structured to project a magnetic field outwardly therefrom.

9. An assembly as recited in claim 6 further comprising mounting means for movably securing said one rotor to said support structure in a manner which maintains a consistent dimension of said air gap.

10. An assembly as recited in claim 9 wherein said mounting means comprises a bearing assembly.

11. An assembly as recited in claim 6 further comprising a commutation assembly disposed and structured to alternate magnetic orientation of predetermined portions of said rotor assembly when in aligned relation with predetermined portions of said stator assembly such that relative rotation therebetween is substantially constant.

12. An assembly as recited in claim 6 wherein each of said plurality of conductive segments of both said rotor assembly and said stator assembly are structured to generate magnetic flux across said air gap, wherein said one rotor assembly and said one stator assembly define a motor absent a central axle.

13. An assembly as recited in claim 12 further comprising a commutation assembly disposed and structured to alternate magnetic orientation of predetermined portions of said rotor assembly when in aligned relation with predetermined portions of said stator assembly such that relative rotation there between is substantially constant.

14. An electric rotating assembly comprising:
(a) a support structure including at least one rotor assembly movably mounted thereon and at least one stator assembly fixedly mounted thereon,
(b) said rotor assembly comprising a plurality of conductive segments disposed in immediately adjacent, spaced relation to one another and collectively disposed in an annular configuration defining an open interior portion,
(c) said stator assembly comprising a plurality of conductive segments wherein predetermined adjacent ones of said conductive segments are of opposite polarity,
(d) said stator assembly disposed within said open interior portion in concentrically surrounded relation by said rotor assembly,
(e) said stator assembly further comprising at least two primary stator portions disposed in spaced apart, substantially opposing relation to one another and at least two secondary stator portions disposed in spaced apart, substantially opposing relation to one another; each of said primary and said secondary stator portions comprising a plurality of magnetic segments extending along the respective lengths thereof,
(f) said rotor assembly disposed in spaced relation to said stator assembly to define an air gap between said conductive segments of said rotor assembly and said stator assembly during rotation of said rotor assembly, and
(g) said stator assembly and support structure cooperatively structured to define an axle-less assembly defined by the absence of a centrally disposed shaft.

15. An assembly as recited in claim 4 wherein said stator assembly comprises said plurality of conductive segments of said stator assembly disposed in adjacent, spaced relation to one another and collectively defining a continuous annular array disposed in surrounding relation to said central opening.

16. An assembly as recited in claim 15 wherein said stator assembly comprises at least two primary stator portions disposed in spaced apart, substantially opposing relation to one another and at least two secondary stator portions disposed in spaced apart, substantially opposing relation to one another; each of said primary and said secondary stator portions comprising a plurality of magnetic segments extending along the respective lengths thereof.

17. An electric rotating assembly comprising:
(a) a support structure including a plurality of rotor assemblies movably mounted thereon and at least one stator assembly fixedly mounted thereon,
(b) said stator assembly comprises a plurality of stator structures each disposed in cooperative alignment with a different one of said rotor assemblies so as to define an air gap there between, (c) said plurality of rotor assemblies each rotationally connected so as to rotate relative to one another and relative to a correspondingly positioned one of said stator structures, (d) said stator assembly disposed within said open interior portion in concentrically surrounded relation by said rotor assembly, and (e) said stator assembly and support structure cooperatively structured to define an axle-less assembly defined by the absence of a centrally disposed supporting shaft.

18. An assembly as recited in claim 17 wherein each of said plurality of rotor assemblies are structured to rotate relative to one another at a different speed and torque and in the same or opposite directions.

19. An assembly as recited in claim 17 wherein each of said rotor assemblies comprises a plurality of conductive segments collectively disposed in a continuous annular configuration and in surrounding relation to a common open interior portion.

20. An assembly as recited in claim 19 wherein said plurality of stator structures are disposed within said open interior portion in concentrically surrounded relation by said plurality of rotor assemblies.

21. An assembly as recited in claim 20 wherein said plurality of rotor assemblies are disposed in a movably interconnected, stacked array and said plurality of stator structures are disposed in a fixed, interconnected stacked array.

22. An assembly as recited in claim 19 wherein each of said stator assemblies comprises a plurality of conductive segments disposed in operatively aligned relation to said conductive segments of a different one of said plurality of rotor assemblies, at least one of said plurality of rotor assemblies and a corresponding one of said pluralities of stator segments comprises respective conductive segments thereof being parallel to one another and disposed at a predetermined angular orientation relative to an upright orientation.

23. An assembly as recited in claim 22 wherein said predetermined angular orientation is between about 0 degrees and about 180 degrees.

24. An assembly as recited in claim 22 wherein said predetermined angular orientation is between about 45 degrees and about 135 degrees.

25. An assembly as recited in claim 22 wherein each of said stator assemblies comprises a plurality of conductive segments disposed in cooperatively aligned relation to said conductive segments of a different one of said pluralities of rotor assemblies, at least two of said pluralities of rotor assemblies and a corresponding one of said pluralities of stator assemblies comprise respective conductive segments thereof being parallel to one another and disposed at a predetermined angular orientation relative to an upright orientation.

26. An assembly as recited in claim 17 wherein one of said plurality of rotor assemblies is connected in driving relation to a first power takeoff assembly.

27. An assembly as recited in claim 26 wherein said first power takeoff assembly is located exteriorly of said plurality of rotor assemblies.

28. An assembly as recited in claim 26 wherein another of said plurality of rotor assemblies is connected in driving relation to a second power takeoff assembly.

29. An assembly as recited in claim 28 wherein said second power takeoff assembly is mounted exteriorly of an outer periphery of said plurality of rotor assemblies.

* * * * *